US008793419B1

(12) United States Patent
Yeung et al.

(10) Patent No.: US 8,793,419 B1
(45) Date of Patent: Jul. 29, 2014

(54) INTERFACE BETWEEN MULTIPLE CONTROLLERS

(75) Inventors: Kwok W. Yeung, Milpitas, CA (US); Meng-Kun Lee, Cupertino, CA (US); Gubo Huang, Milpitas, CA (US)

(73) Assignee: SK hynix memory solutions inc., San Jose, CA (US)

( * ) Notice: Subject to any disclaimer, the term of this patent is extended or adjusted under 35 U.S.C. 154(b) by 139 days.

(21) Appl. No.: 13/286,495

(22) Filed: Nov. 1, 2011

Related U.S. Application Data

(60) Provisional application No. 61/416,261, filed on Nov. 22, 2010.

(51) Int. Cl.
G06F 13/00 (2006.01)
G06F 13/14 (2006.01)
G06F 11/00 (2006.01)
G06F 11/16 (2006.01)

(52) U.S. Cl.
USPC ........... 710/110; 710/300; 710/305; 711/118; 714/3; 714/6.1; 714/6.3

(58) Field of Classification Search
USPC ........ 710/74, 107, 110, 300, 305; 711/1–3, 5, 711/100–101, 104–105, 117–120, 138–139, 711/202; 714/1–4.11, 6.1, 6.2, 6.3
See application file for complete search history.

(56) References Cited

U.S. PATENT DOCUMENTS

| | | | | |
|---|---|---|---|---|
| 4,720,798 A | * | 1/1988 | Reed et al. | 29/847 |
| 6,145,069 A | * | 11/2000 | Dye | 711/170 |
| 2003/0209740 A1 | * | 11/2003 | Miyamoto et al. | 257/286 |
| 2006/0221733 A1 | * | 10/2006 | Yang | 365/200 |
| 2008/0024899 A1 | * | 1/2008 | Chu et al. | 360/69 |
| 2008/0046638 A1 | * | 2/2008 | Maheshwari et al. | 711/103 |
| 2008/0195802 A1 | * | 8/2008 | Lee et al. | 711/103 |
| 2009/0249015 A1 | * | 10/2009 | Tzeng | 711/165 |
| 2009/0268502 A1 | * | 10/2009 | Miura et al. | 365/63 |
| 2009/0313416 A1 | * | 12/2009 | Nation | 711/100 |
| 2010/0030951 A1 | * | 2/2010 | Kim | 711/103 |
| 2010/0061134 A1 | * | 3/2010 | Jeddeloh | 365/63 |
| 2010/0125695 A1 | * | 5/2010 | Wu et al. | 711/103 |
| 2010/0201397 A1 | * | 8/2010 | Gillingham | 326/30 |
| 2010/0202237 A1 | * | 8/2010 | Moshayedi et al. | 365/228 |
| 2010/0211853 A1 | * | 8/2010 | Madan et al. | 714/773 |
| 2010/0293420 A1 | * | 11/2010 | Kapil et al. | 714/710 |
| 2010/0318879 A1 | * | 12/2010 | Yu | 714/758 |
| 2011/0119438 A1 | * | 5/2011 | Zhou et al. | 711/104 |
| 2011/0191522 A1 | * | 8/2011 | Condict et al. | 711/103 |
| 2011/0197031 A1 | * | 8/2011 | Aho et al. | 711/130 |
| 2011/0246708 A1 | * | 10/2011 | Li et al. | 711/103 |
| 2011/0258362 A1 | * | 10/2011 | McLaren et al. | 711/5 |

OTHER PUBLICATIONS

"General DDR SDRAM Functionality". Technical Note TN-46-05. Micron Technology, Inc. Jul. 2001.*

* cited by examiner

*Primary Examiner* — Thomas J Cleary
(74) *Attorney, Agent, or Firm* — Van Pelt, Yi & James LLP

(57) ABSTRACT

A second controller is communicated with from a first controller via an interface. Storage is also communicated with from the first controller via the interface. The first controller is configured to be a master on the interface and the second controller and the storage are configured to be targets on the interface.

18 Claims, 9 Drawing Sheets

US 8,793,419 B1

INTERFACE BETWEEN MULTIPLE CONTROLLERS

CROSS REFERENCE TO OTHER APPLICATIONS

This application claims priority to U.S. Provisional Patent Application No. 61/416,261 entitled HYBRID DDR filed Nov. 22, 2010 which is incorporated herein by reference for all purposes.

BACKGROUND OF THE INVENTION

A printed circuit board (PCB) typically has multiple electrical components where input(s) and/or output(s) of one component are connected to those of another component. Components on a PCB may include (but are not limited to): microprocessors, application-specific integrated circuits (ASIC), field-programmable gate arrays (FPGA), storage (e.g., Flash, dynamic random-access memory (DRAM), magnetic disk drive, etc.) and/or discrete components (e.g., capacitors, inductors, resistors, etc.).

The amount of money and/or time spent to develop a component for use on a PCB may be quite high. For example, the functionality performed may be quite complex and debugging may require a significant amount of resources. In some cases, a systems manufacturer (e.g., who acquires electronic components from component manufacturers and integrates them together on a PCB) may have a verification process for vetting components. It would be desirable if components could be integrated together in new ways that (for example) mitigate the redesign required and/or keep the costs down.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
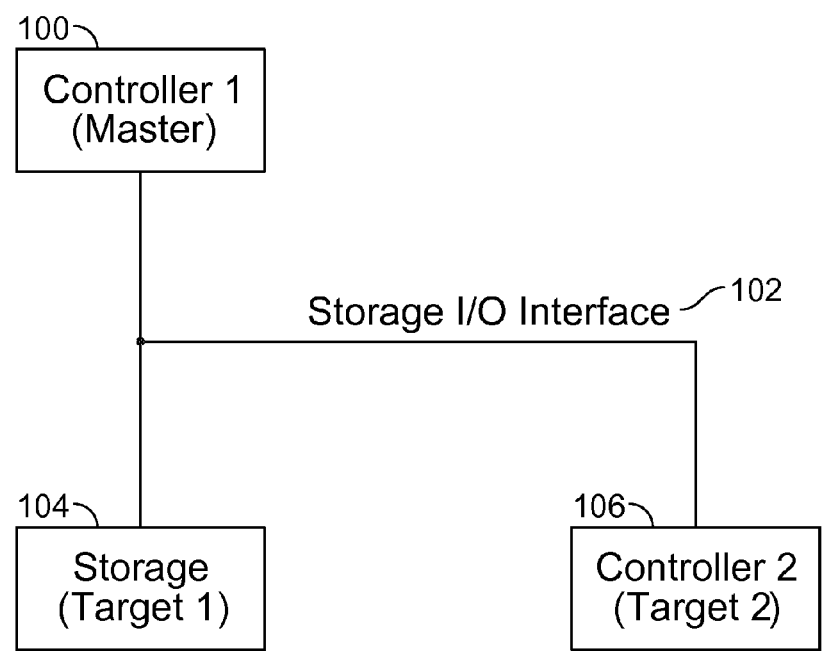
FIG. 1 is a diagram showing an embodiment of a controller configured to be a target via an interface.

FIG. 1 is a diagram showing an embodiment of a controller configured to be a target via an interface. In the example shown, there are two controllers, a first controller (100) and a second controller (106) which communicate via storage I/O interface 102. First controller 100 is configured to be a master on storage I/O interface 102 and second controller 106 is configured to be a target on storage I/O interface 102. The example also includes storage 104, which is also configured to be a target on storage I/O interface 102.

As used herein, a master is able to initiate a command, instruction or query, whereas a slave is limited to responding to a command and cannot initiate activity. For example, controller 100 may issue a write command to storage 104. Storage 104, which is a target, responds to the command issued by storing data per the instruction. A target is sometimes referred to as a slave. Various example commands include (but are not limited to) write commands, read commands, status query commands, control/management commands, etc.

In some embodiments, the first and second controllers (100 and 106) and storage 104 are separate semiconductor components. For example, storage I/O interface 102 may be implemented as one or more routes on a printed circuit board (PCB). In various embodiments, the first controller and/or second controller are implemented as application-specific integrated circuits (ASIC), field-programmable gate arrays (FPGA), microprocessors configured to execute firmware, etc.

In one example application, first controller 100 and storage 104 are existing components configured to operate together and communicate via storage I/O interface 102. A new system is desired which further includes second controller 106. For example, the first controller may be a disk drive controller and a new system is desired which includes Flash memory storage in addition to disk drive storage (i.e., the second controller is a Flash controller). Configuring second controller 106 to operate as a target and communicate with first controller 100 via storage I/O interface 102 as shown herein has some advantages. With respect to the size of a PCB on which the system is mounted, reusing storage I/O interface 102 minimizes the amount of additional PCB space required to add second controller 106 because the package size of controller 100 can remain the same. If another I/O interface were added for communicating between the first and second controller, new package pins on the first controller would be required. Furthermore, these additional I/O interfaces need to be routed on the PCB between the first controller and second controller, which makes the PCB larger because of the additional routing required. Using storage I/O interface 102 to further communicate with the second controller does not require new package pins for the first controller. Similarly, some of the routing of storage I/O interface 102 on the board between first controller 100 and storage 104 may be used or otherwise extended to connect up second controller 106, which may require less routing space than a dedicated interface, separate from storage I/O interface 102, would. Another benefit may be in the amount of redesign required for controller 100. Modifying an existing module on the first controller for communicating via storage I/O interface 102 may be less of a redesign effort than creating a new module on the first controller to communicate via a new interface.

The following figure shows a more specific embodiment of the system shown in FIG. 1.

Figure 2:
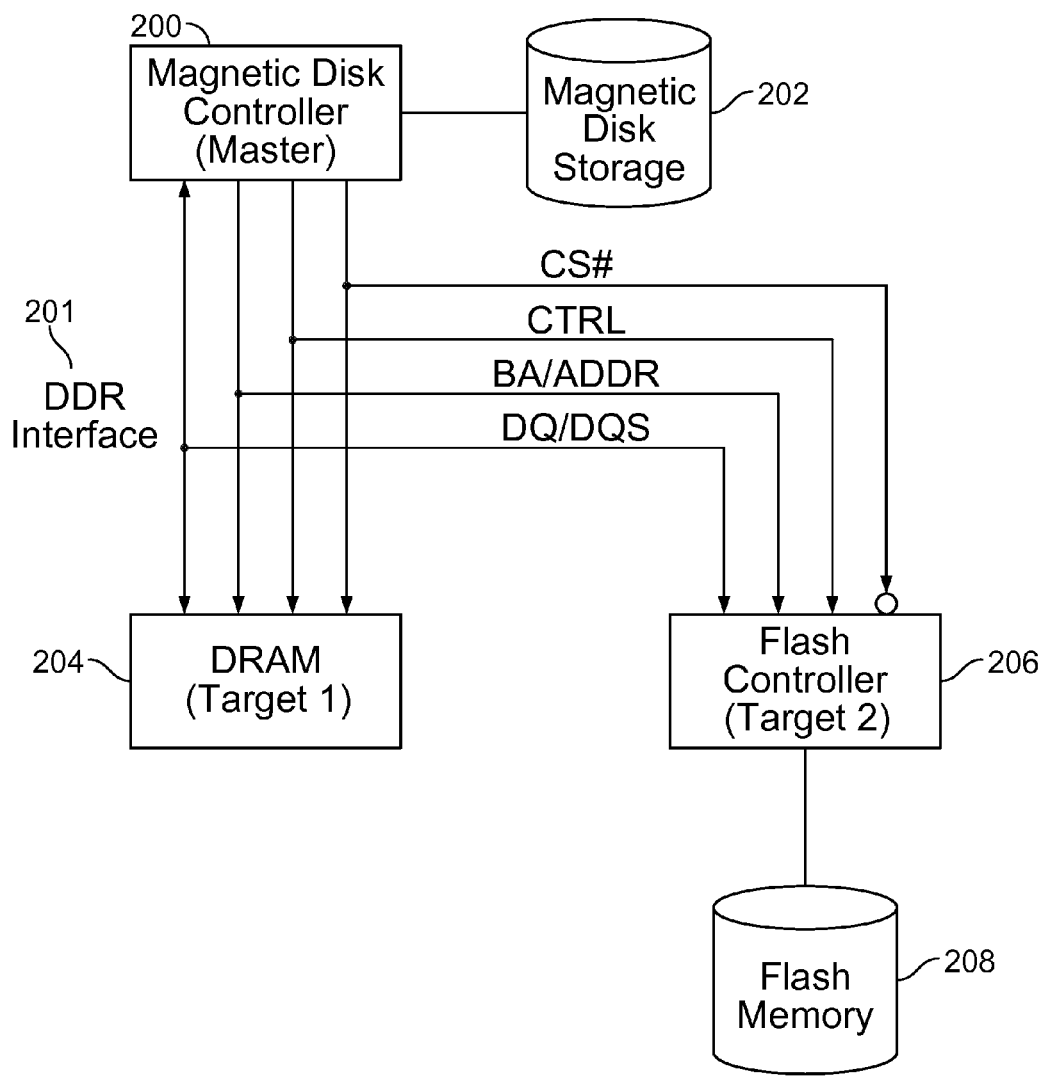
FIG. 2 is a diagram showing an embodiment of a magnetic disk controller configured to be a target of a Flash controller master via a double data rate (DDR) interface.

FIG. 2 is a diagram showing an embodiment of a magnetic disk controller configured to be a target of a Flash controller master via a double data rate (DDR) interface. In the example shown, the first and second controllers (200 and 206) are magnetic disk and Flash controllers, respectively. As such, Flash memory 208 is coupled to Flash controller 206 and magnetic disk storage 202 is coupled to magnetic disk controller 200. In various embodiments, storage media and its corresponding controller are integrated in the same component or implemented as separate components. For example, Flash memory 208 may be on the same component or on a different component as Flash controller 206. In various embodiments, the magnetic disk controller 200 and Flash controller 206 perform a variety of processing functions for writing to and reading from their respective media, including error correction processing, (de)modulation, analog to digital conversion, equalization, etc.

Magnetic disk controller 200 is a master on DDR interface 201 and Flash controller 206 is a target on DDR interface 201. Dynamic random-access memory (DRAM) 204 is also a target on DDR interface 201. An external DRAM may be attractive to use because it may be relatively inexpensive compared to on-chip static random-access memory (SRAM). In some embodiments, DRAM 204 is used by magnetic disk controller 200. Some examples of information stored in DRAM 204 by magnetic disk controller 200 include (but are not limited to) information related to the storage and management of (user) data in magnetic disk storage 202. For example, magnetic disk controller 200 may store configuration settings or intermediate values from error correction encoding/decoding in DRAM 204. In another example, magnetic disk controller 200 manages and stores a table of defective sectors in DRAM 204, so that it knows which sectors in magnetic disk storage 202 do not work and thus not to store data there. In another example, the access time for magnetic disk storage 202 may be much longer than the access time for DRAM 204 and copies of at least some data stored in magnetic disk storage 202 are also stored in DRAM to speed up access.

In this particular example, either DRAM 204 or Flash controller 206 can be selected using CS#, but both cannot be selected at the same time. When CS# is low, DRAM 204 is selected and Flash controller 206 is not; when CS# is high, DRAM 204 is not selected but Flash controller 206 is. In some other embodiments, this is configured differently (e.g., two or more components are able to be selected at the same time). Although this example shows a DDR interface, a variety of interfaces may be used.

Figure 3:
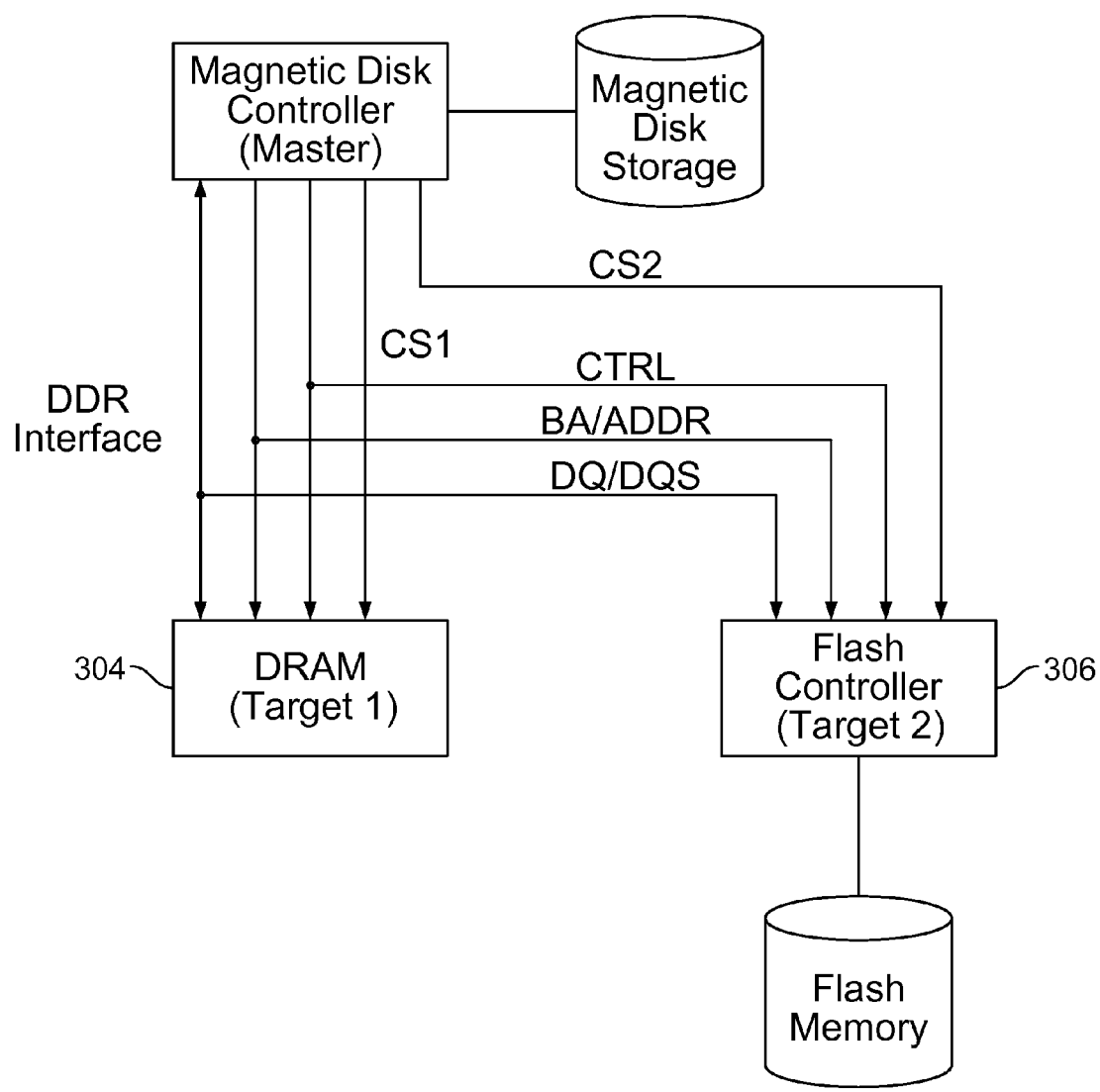
FIG. 3 is a diagram showing an embodiment of a system with multiple chip select signals.

FIG. 3 is a diagram showing an embodiment of a system with multiple chip select signals. In the example shown, the system of FIG. 3 is similar to that shown in FIG. 2, except there are two chip select signals in the DDR interface: CS1 which is connected to DRAM 304 and CS2 which is connected to Flash controller 306. The two chip select signals may be implemented in a variety of ways. In some embodiments, the signals are mutually exclusive so that at most only one component can be selected at any time (e.g., DRAM 304 or Flash controller 306, but not both). In some other embodiments, both targets can be selected at the same time if desired.

Figure 4A:
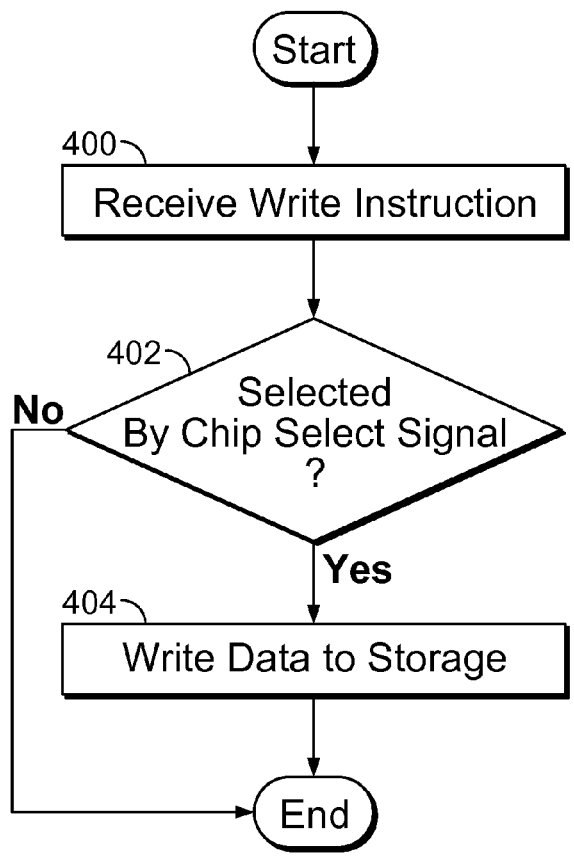
FIG. 4A is a flowchart illustrating an example of a write operation performed by a target.

FIG. 4A is a flowchart illustrating an example of a write operation performed by a target. For example, the DRAM and/or Flash controller shown in FIG. 2 or 3 may perform the example write operation.

At 400, a write instruction is received. For example, a write instruction may be received over DDR interface 201 in FIG. 2. It is determined at 402 whether the device receiving the write instruction has been selected by a chip select signal. For example, if the process is performed by DRAM 304 in FIG. 3, then it will make the determination based on CS1. In some embodiments, two or more targets may be selected simultaneously. If a receiving device has been selected by a chip select signal, then data is written to storage at 404. For example, if the process is performed by DRAM 304 in FIG. 3 then data is stored in DRAM 304; if the process is performed by Flash controller 306 then data is stored in Flash memory 308. Otherwise, if it has not been selected by a chip select signal at 402 the process ends.

Figure 4B:
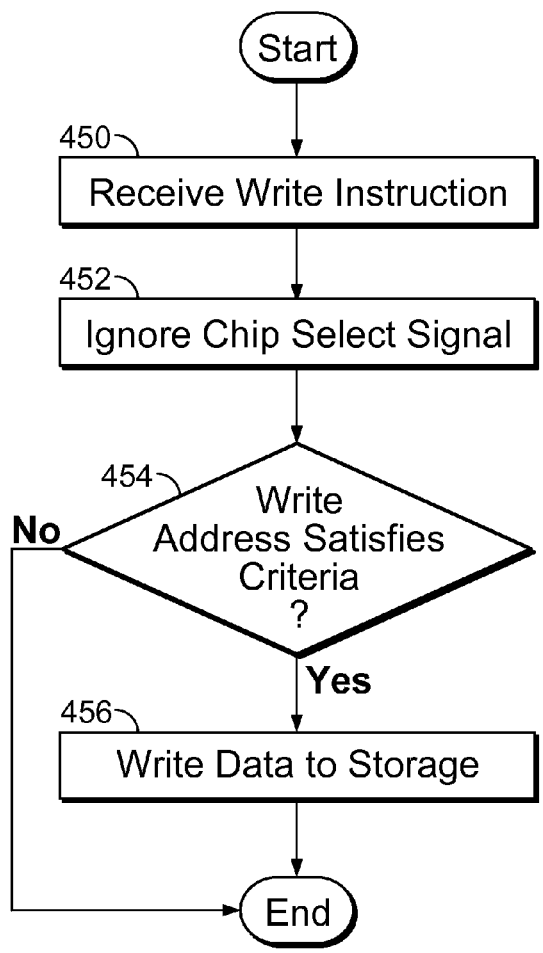
FIG. 4B is a flowchart illustrating an embodiment of a duplicate write operation performed by a target.

FIG. 4B is a flowchart illustrating an embodiment of a duplicate write operation performed by a target. In some embodiments, the example write operation is referred to as snooping. In some embodiments, the example process is performed by the controller that is configured to operate as a target (e.g., Flash controller 306 in FIG. 3).

At 450, a write instruction is received. At 452, a chip select signal is ignored. For example, if the process is being performed by flash controller 306 then CS2 is ignored. It is determined at 454 whether a write address satisfies a criterion. In one example, the criterion is whether the write address is within a certain ranges of range of addresses (e.g., F00-FFF). In some embodiments, more than one range of addresses can be specified. If the write address satisfies the criterion at 454, then data is written to storage at 456. For example, so long as the write address is within a specified range, the data is written regardless of the state of a chip select signal. If the write address does not satisfy the criterion at 454, the process ends.

In some embodiments, one target is configured to perform the exemplary write process shown in FIG. 4A and another target is configured to perform the exemplary write process shown in FIG. 4B. For example, DRAM 204 (304) in FIG. 2 (3) may perform the process shown in FIG. 4A and Flash controller 206 (306) in FIG. 2 (3) may perform the process shown in FIG. 4B. In such a scenario, at least some of the data (e.g., those having an address which satisfies the criterion at 454) will be stored in duplicate in both the DRAM and in Flash memory. In some embodiments, a register setting or other control determines which write process a target uses. In one example, DRAM and Flash memory are used collectively as a cache for information stored in magnetic disk storage. In the event the cached information stored in a DRAM cannot be accessed (e.g., because of an interruption in power), the information can still be recovered from Flash memory. In one example, the Flash controller experiences a program error and loses the data while attempting to write to Flash memory. The data stored in the DRAM can be used as a backup to prevent data loss. In some embodiments, information from magnetic disk storage is stored in DRAM and Flash memory because accessing DRAM or Flash memory consumes less power.

Figure 5:
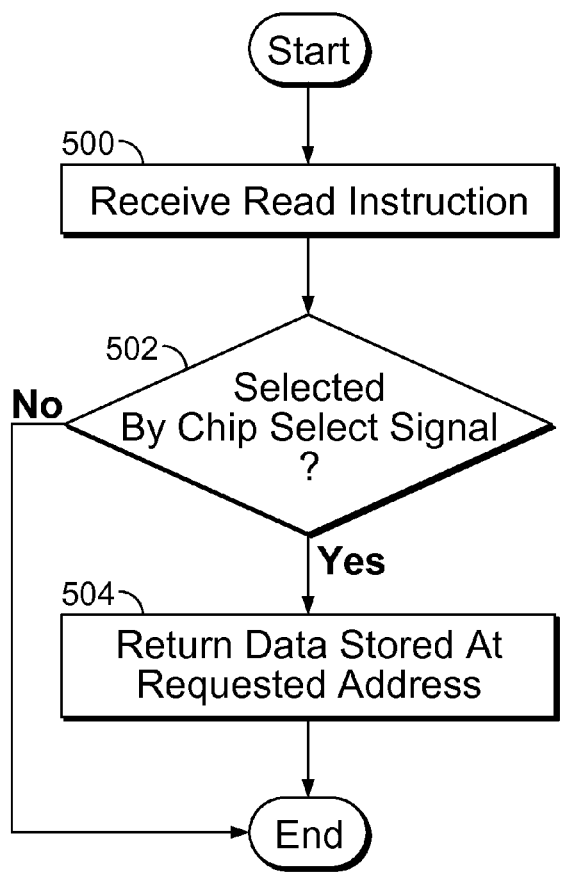
FIG. 5 is a flowchart illustrating an example of a read process performed by a target.

FIG. 5 is a flowchart illustrating an example of a read process performed by a target. In various embodiments, DRAM 204 (304) and/or Flash controller 206 (306) in FIG. 2 (3) perform(s) the example read process. A read instruction is received at 500. For example, magnetic disk controller 200 may drive DDR interface 201 so that a read instruction is issued to and received by DRAM 204 and Flash controller 206 in FIG. 2. At 502, it is determined whether a selection by a chip select signal has occurred. For example, both DRAM 204 and Flash controller 206 may check the state of their chip select signals. If the chip select signal does not indicate a selection at 502, the process ends. Otherwise, data stored at a requested address is returned at 504. For example, if DRAM 204 in FIG. 2 is selected, DRAM 204 drives the data line with the requested information.

In some instances when multiple components are connected via a common interface on a PCB, the connections on the PCB suffer from transmission line effects. More specifically, because of impedance differences, ringing or reflections may occur where the signal bounces back at the end of a connection on the PCB, causing noise on the line. It may be desirable to mitigate such noise and one embodiment of such a technique is described in further detail below. The technique described below is merely an example and any appropriate technique may be employed.

Figure 6:
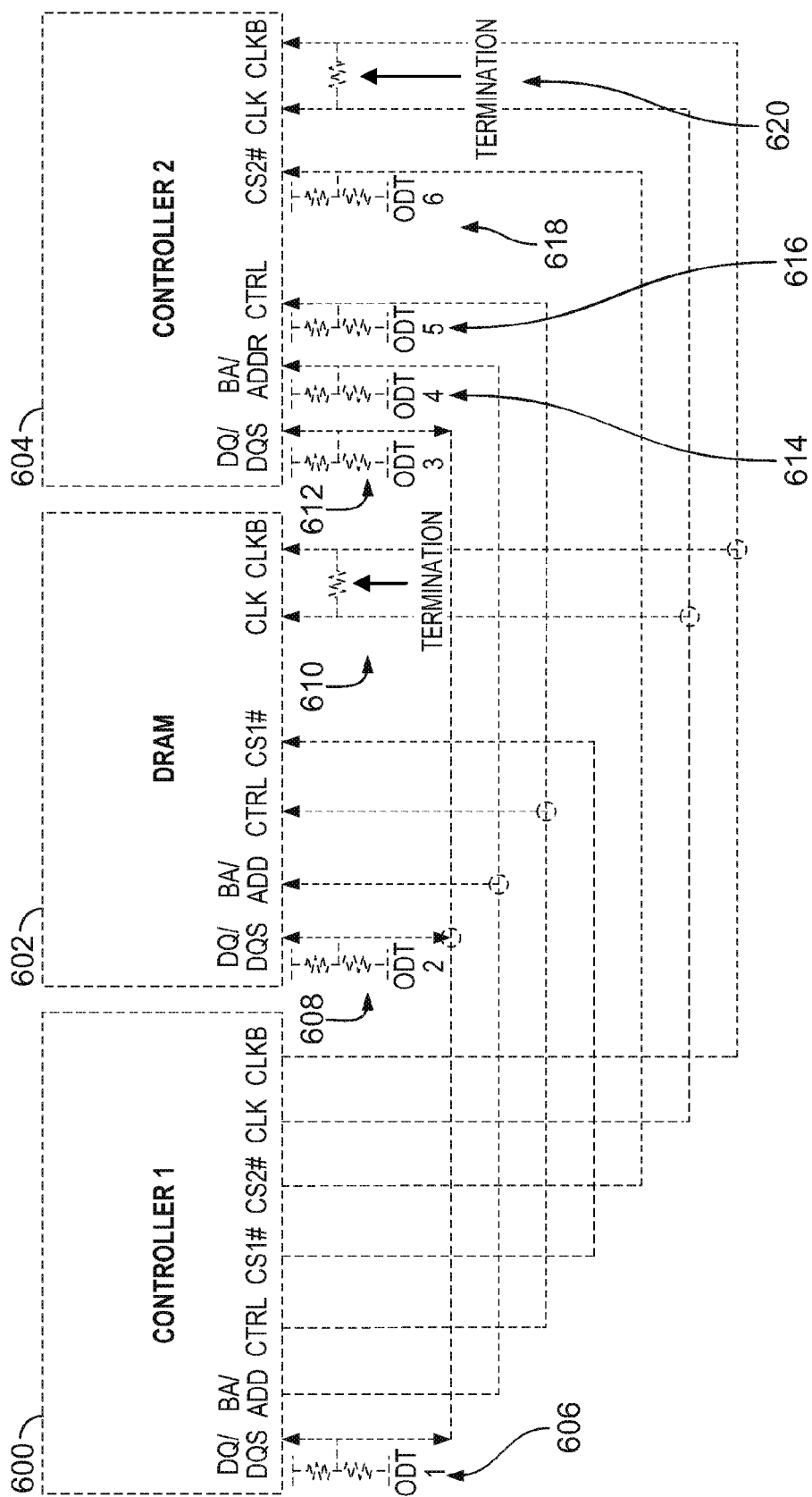
FIG. 6 is a diagram showing an embodiment of terminations to mitigate reflections in PCB connections.

FIG. 6 is a diagram showing an embodiment of terminations to mitigate reflections in PCB connections. In the example shown, a first controller (600), DRAM (602) and a second controller (604) are separate (e.g., semiconductor) components laid out on a PCB as shown (i.e., the two controllers are at the ends and the DRAM is in the middle). Each of the components includes one or more on-die terminations (ODT). As their name indicates, ODTs are located on the die of a semiconductor device, as opposed to a discrete component which is soldered onto the PCB external to the semiconductor device. In some embodiments, an ODT is is connected to an I/O pad. In this particular example, the ODTs are shown as voltage dividers (i.e., two resistors in series). Therefore, although this figure shows ODTs as being external to their respective devices, they are part of and internal to the device they are associated with.

In this example, controller 600 has ODT 1 (606) on the DQ/DQS line. DRAM 602 has ODT 2 (608) at DQ/DQS and a differential termination (610) between CLK and CLKB. In this example, differential termination 610 and differential termination 620 are discrete resistor components soldered on the PCB (i.e., external to the semiconductor device). Controller 604 has ODT 3 (612) at DQ/DQS, ODT 4 (614) at BA/ADD, ODT 5 (616) at CTRL, ODT 6 (618) at CS2# and differential termination 620 between CLK and CLKB.

Depending upon the operation performed (e.g., a read operation or a write operation), different sets of terminations are turned on. During any of the write operations performed (e.g., when first controller 600 is writing only to DRAM 602, when first controller 600 is writing only to second controller 604 or when first controller 600 is writing to both DRAM 602 and second controller 604), ODT 3 (612), ODT 4 (614), ODT 5 (616) and ODT 6 (618) at the second controller (604) are turned on. As used herein, to turn on an ODT includes powering on a (e.g., voltage) supply or source connected to a voltage divider. Put another way, a DC current pass from power supply to gnd through resistor divider.

During a read operation, either DRAM 602 or controller 604 will drive the data bus (DQ/DQS) such that a signal will propagate towards the DQ/DQS pin of controller 600. As such, when a read operation is performed, ODT 1 (606) on controller 600 is turned on to prevent a reflection from occurring where the DQ/DQS bus terminates at the first controller (600). ODT 3-6 (614-620) on controller 604 are also turned on during any read operation. During read operations there are two ODTs active on the DQ/DQS line at the same time: ODT 1 (606) on controller 600 and ODT 3 (612) on controller 604. If DRAM 602 drives the data bus (e.g., because the read operation is directed to the DRAM) then there will be two far ends of the signal: the DQ/DQS pin at controller 600 and the DQ/DQS pin at controller 604. As such, both ODTs are on during a read operation to prevent reflections at their respective ends. ODT 2 (608), which is located on the die of DRAM 602, is not turned on in this particular layout (i.e., with DRAM 602 as the center component). In some applications, one manufacturer makes DRAM 602 while another makes first controller 600 (and in some cases a third manufacturer makes second controller 604). As such, DRAM 602 may come with ODT 2 (608) already built-in. One advantage of the termination technique shown herein is that existing components manufactured by other vendors (such as DRAM 602) may be employed.

In some embodiments, if the layout of components is modified then at least some of the ODTs are similarly swapped. For example, if controller 604 and DRAM 602 are repositioned on a PCB so that DRAM 602 is at the end and controller 604 is in the center, the DRAM would include ODTs at BA/ADD, CTRL and CS1# which are turned on at the times described above. Using the BA/ADD and CTRL lines as an example, ODTs are located on second controller 604 for the PCB layout shown in this figure because that is where the signals terminate (i.e., they originate at controller 600 and the far end of those lines is at controller 604).

In some embodiments, if the bus is not in use, some or all of the ODTs are turned off to save DC power.

Figure 7:
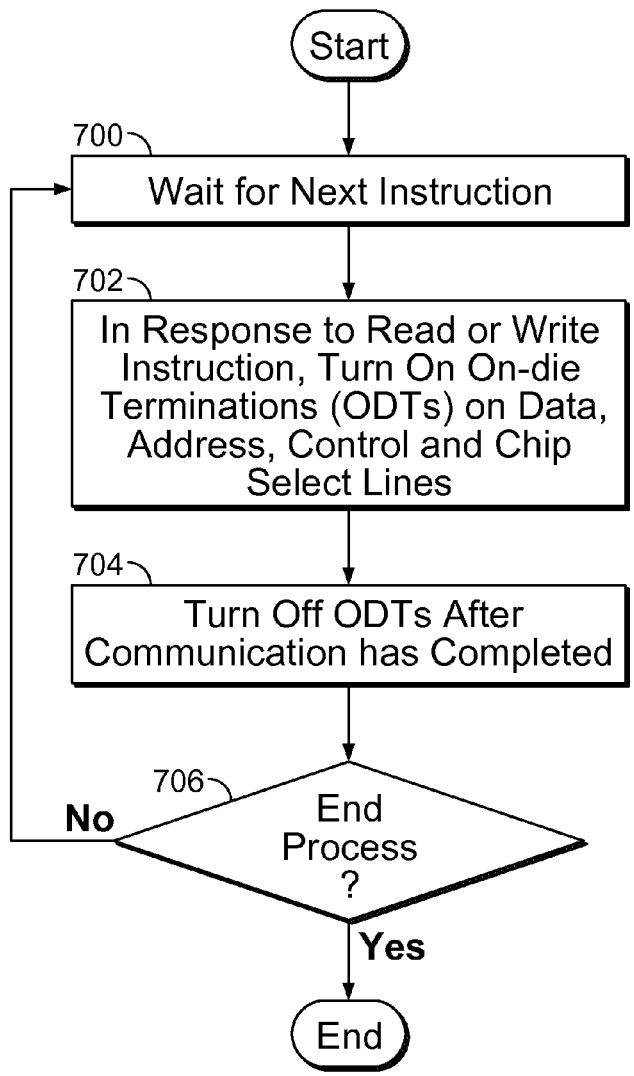
FIG. 7 is a flowchart illustrating an embodiment of a process for managing ODTs on a target device at a far end of an interface.

FIG. 7 is a flowchart illustrating an embodiment of a process for managing ODTs on a target device at a far end of an interface. In some embodiments, the second controller (604) in FIG. 6 performs the example process. A wait for a next instruction occurs at 700. At 702, on-die terminations (ODTs) on a data, address, control and chip select lines are turned on in response to a read or write instruction. For example, there may be some (on-chip) control logic which interprets the signals on a DDR interface to determine the current state of the DDR interface (e.g., Idle State, Read State, Write State, etc.) and the state is used by control logic to turn off/on the ODT at appropriate times. In some embodiments, a signal (e.g., in addition to the signals which comprise a DDR interface) is passed from a master to a target (e.g., via a PCB connection) which is used by control logic at the target to know when to turn off/on the ODTs.

The ODTs are turned off after communication has completed at 704. For example, some of the techniques described above may be used to determine the state a DDR interface is in or a timeout may be used. It is determined at 706 whether to end a process. For example, the system may be shut down and the control logic may turn off. If it is determined not to end the process at 706, a next instruction is waited for at 700.

Figure 8:
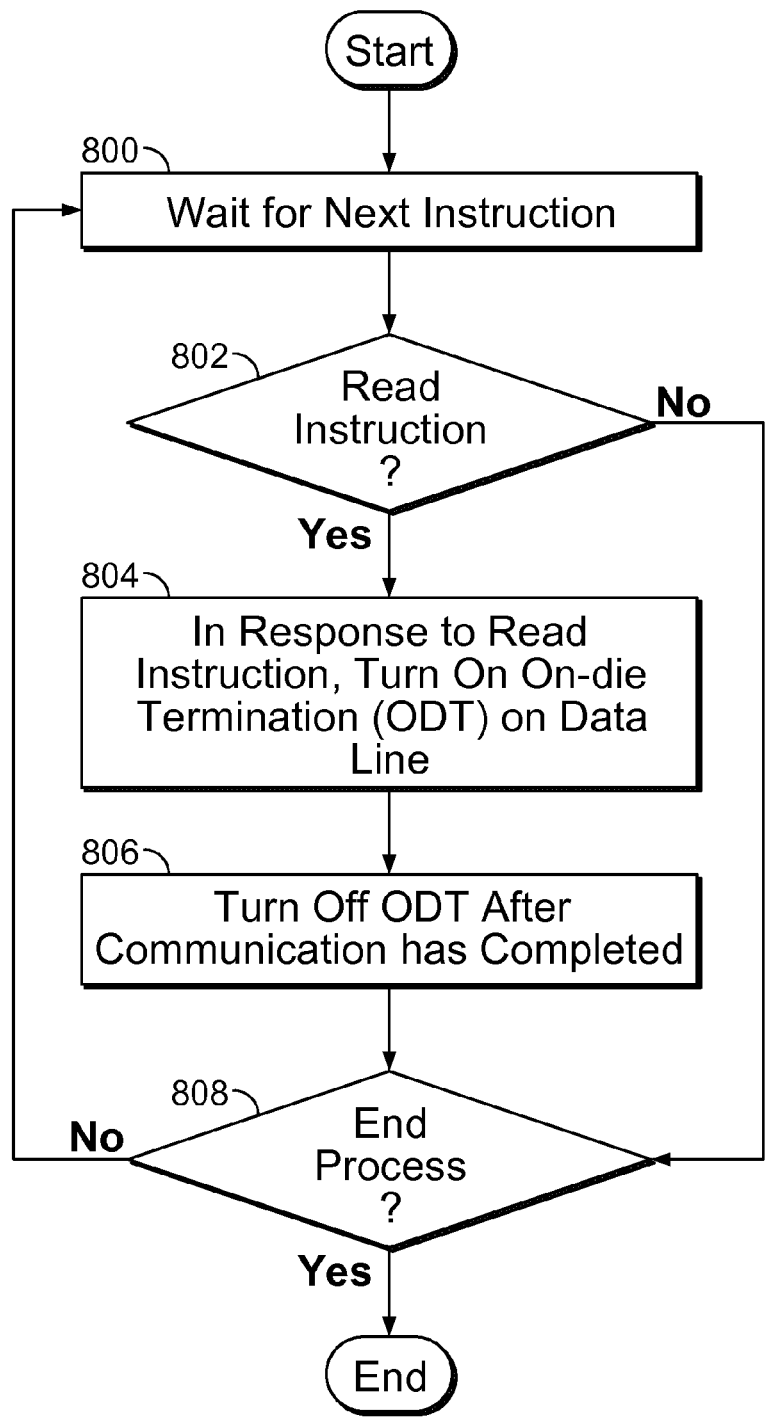
FIG. 8 is a flowchart illustrating an embodiment of a process for managing an ODT on a master.

FIG. 8 is a flowchart illustrating an embodiment of a process for managing an ODT on a master. In some embodiments, the first controller (600) in FIG. 6 performs the example process shown. At 800, a next instruction is waited for. For example, a read or write instruction may be triggered by an application or user. It is determined at 802 if a next instruction is a read instruction. For example, the master may receive a request for stored information from a user or application.

If it is not a read instruction, it is determined at 808 whether to end the process. If it is a read instruction, an on-die termination (ODT) on a data line is turned on in response to a read instruction at 804. In FIG. 6, for example, ODT 1 (606) is turned on when a read operation occurs. At 806, the ODT is turned off after communication has completed. It is then determined at 808 whether to end the process. If not, a wait for a next instruction occurs at 800.

In some embodiments, depending upon which component drives the bus during a read operation, different ODTs are turned on. For example, if a read operation in FIG. 6 is directed to DRAM 602 then both ODT 1 (606) and ODT 3 (612) are turned on. If a read operation is directed to controller 604, then ODT 1 (606) is turned on and ODT 3 (612) is turned off. In either case, ODT 2 (608) is off.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
communicating with a second controller from a first controller via an interface; and
communicating with storage from the first controller via the interface, wherein:
the first controller is configured to be a master on the interface;
the second controller and the storage are configured to be targets on the interface;
the second controller is configured to be in a first write mode, wherein in response to receiving a write instruction, the second controller is configured to:
determine whether a write address associated with the write instruction is within a range of predefined addresses; and
in the event it is determined that the write address is within the range of predefined addresses, store data associated with the write instruction in a second storage managed by the second controller even if a chip select signal associated with the interface indicates that the second controller is not selected; and
the storage is configured to be in a second write mode, wherein in response to receiving the same write instruction as the second controller, the storage is configured to:
determine whether the chip select signal indicates that the storage is selected; and
in the event it is determined that the chip select signal indicates that the storage is selected, store the data associated with the write instruction in the storage, such that in the event (1) the write address is within the range of predefined addresses and (2) the chip select signal indicates that the storage is selected, the data associated with the write instruction is stored in both the storage and the second storage.

2. The method recited in claim 1, wherein the interface includes a double data rate (DDR) interface.

3. The method recited in claim 1, wherein the first controller includes one or more of the following: a microprocessor, an application-specific integrated circuit (ASIC) or a field-programmable gate array (FPGA).

4. The method recited in claim 1, wherein the first controller is a first semiconductor component on a printed circuit board (PCB), the second controller is a second semiconductor component on the PCB and the storage is a third semiconductor component on the printed circuit board.

5. The method recited in claim 1, wherein the storage includes a dynamic random-access memory (DRAM).

6. The method recited in claim 1, wherein the first controller includes a first storage controller configured to manage magnetic disk storage and the second controller includes a second storage controller configured to manage Flash memory.

7. The method recited in claim 1, wherein:
either the storage or the second controller is located further away from the first controller than the other component; and
the further-away component includes an on-die termination (ODT) on a connection associated with the interface.

8. The method recited in claim 7 further comprising turning on the ODT during one or more of the following: a write operation or a read operation.

9. The method recited in claim 7, wherein the ODT is on one or more of the following: an address connection associated with the interface, a control connection associated with the interface or a chip select connection associated with the interface.

10. The method recited in claim 1, wherein the first controller includes an on-die termination (ODT) on a data connection associated with the interface.

11. The method recited in claim 10 further comprising turning on the ODT during a read operation.

12. The method recited in claim 1, wherein:
the storage includes an on-die termination (ODT) on a data connection associated with the interface; and
the method further includes keeping the ODT turned off at all times.

13. A system, comprising:
a first controller configured to be a master on an interface;
a second controller; and
a storage, wherein:
the second controller and the storage are configured to be targets on the interface;
from the first controller, the second controller is communicated with via the interface;
the second controller is configured to be in a first write mode, wherein in response to receiving a write instruction, the second controller is configured to:
determine whether a write address associated with the write instruction is within a range of predefined addresses; and
in the event it is determined that the write address is within the range of predefined addresses, store data associated with the write instruction in a second storage managed by the second controller even if a chip select signal associated with the interface indicates that the second controller is not selected; and
the storage is configured to be in a second write mode, wherein in response to receiving the same write instruction as the second controller, the storage is configured to:
determine whether the chip select signal indicates that the storage is selected; and
in the event it is determined that the chip select signal indicates that the storage is selected, store the data associated with the write instruction in the storage, such that in the event (1) the write address is within the range of predefined addresses and (2) the chip select signal indicates that the storage is selected, the data associated with the write instruction is stored in both the storage and the second storage.

14. The system recited in claim 13, wherein the first controller includes one or more of the following: a microprocessor, an application-specific integrated circuit (ASIC) or a field-programmable gate array (FPGA).

15. The system recited in claim 13, wherein the first controller is a first semiconductor component on a printed circuit board (PCB), the second controller is a second semiconductor component on the PCB and the storage is a third semiconductor component on the printed circuit board.

16. The system recited in claim 13, wherein the first controller includes a first storage controller configured to manage magnetic disk storage and the second controller includes a second storage controller configured to manage Flash memory.

17. The system recited in claim 13, wherein:
either the storage or the second controller is located further away from the first controller than the other component; and
the further-away component includes an on-die termination (ODT) on a connection associated with the interface.

18. The system recited in claim 13, wherein the first controller includes an on-die termination (ODT) on a data connection associated with the interface.

* * * * *